United States Patent
Daly et al.

(10) Patent No.: US 8,615,634 B2
(45) Date of Patent: Dec. 24, 2013

(54) COORDINATED WRITEBACK OF DIRTY CACHELINES

(75) Inventors: David M. Daly, Croton-On-Hudson, NY (US); Benjiman L. Goodman, Cedar Park, TX (US); Hillery C. Hunter, Deerfield, IL (US); William J. Starke, Round Rock, TX (US); Jeffrey A. Stuecheli, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 8 days.

(21) Appl. No.: 13/447,445

(22) Filed: Apr. 16, 2012

(65) Prior Publication Data

US 2012/0203968 A1 Aug. 9, 2012

Related U.S. Application Data

(63) Continuation of application No. 12/775,510, filed on May 7, 2010.

(51) Int. Cl.
*G06F 12/08* (2006.01)

(52) U.S. Cl.
USPC ......................................................... 711/122

(58) Field of Classification Search
None
See application file for complete search history.

(56) References Cited

U.S. PATENT DOCUMENTS

| | | | | |
|---|---|---|---|---|
| 6,119,205 | A * | 9/2000 | Wicki et al. | 711/143 |
| 6,535,961 | B2 * | 3/2003 | Wilkerson et al. | 711/137 |
| 7,472,230 | B2 * | 12/2008 | Prabhu | 711/143 |
| 8,065,493 | B2 * | 11/2011 | Burchard et al. | 711/154 |

* cited by examiner

*Primary Examiner* — Sheng-Jen Tsai
*Assistant Examiner* — Ramon A Mercado
(74) *Attorney, Agent, or Firm* — Yudell Isidore Ng Russell PLLC

(57) ABSTRACT

A data processing system includes a processor core and a cache memory hierarchy coupled to the processor core. The cache memory hierarchy includes at least one upper level cache and a lowest level cache. A memory controller is coupled to the lowest level cache and to a system memory and includes a physical write queue from which the memory controller writes data to the system memory. The memory controller initiates accesses to the lowest level cache to place into the physical write queue selected cachelines having spatial locality with data present in the physical write queue.

11 Claims, 7 Drawing Sheets

US 8,615,634 B2

COORDINATED WRITEBACK OF DIRTY CACHELINES

This application is a continuation of U.S. patent application Ser. No. 12/775,510 entitled "COORDINATED WRITEBACK OF DIRTY CACHELINES" by David M. Daly et al. filed May 7, 2010, the disclosure of which is hereby incorporated herein by reference in its entirety for all purposes.

BACKGROUND OF THE INVENTION

1. Technical Field

The present invention relates in general to data processing, and in particular, to an efficient utilization of the processor-memory interface in a data processing system.

2. Description of the Related Art

With the rise of multi-core, multi-threaded data processing systems, the throughput of the processor-memory interface has become a limitation on system performance. With multiple multi-threaded processor cores typically sharing a common system memory controller, data locality is easily lost, and identifying and scheduling spatially sequential accesses is difficult. Inefficient scheduling results in performance reductions and consumes unnecessary energy.

Further, while input/output (JO) frequencies continue to scale with processor core operating frequencies, other key parameters, such as the time to read a memory cell or turn a bus around from a write to a read operation (i.e., tWRT, the Write-to-Read Turnaround delay), are not scaling at comparable rates. At higher signaling rates, the electrical integrity of buses becomes much more difficult to maintain, both within the memory chips and across the processor-memory interface. Consequently, a complex set of timing parameters must be observed, which dictate that gaps be inserted when the access stream transitions from a write to a read or vice-versa, significantly degrading effective memory bandwidth even assuming perfect scheduling of memory accesses.

SUMMARY OF THE INVENTION

In practice, perfect or near-perfect scheduling of memory accesses in not achieved, due in part to the limited depth of the physical write queue of commercially practical system memory controllers. Accordingly, scheduling of memory accesses is improved by expanding the effective depth of the memory controller's write queuing resources through leveraging the storage capacity of a lower level cache memory.

In one embodiment, a data processing system includes a processor core and a cache memory hierarchy coupled to the processor core. The cache memory hierarchy includes at least one upper level cache and a lowest level cache. A memory controller is coupled to the lowest level cache and to a system memory and includes a physical write queue from which the memory controller writes data to the system memory. The memory controller initiates accesses to the lowest level cache to place into the physical write queue selected cachelines having spatial locality with data present in the physical write queue.

DETAILED DESCRIPTION OF ILLUSTRATIVE EMBODIMENT

Figure 1:
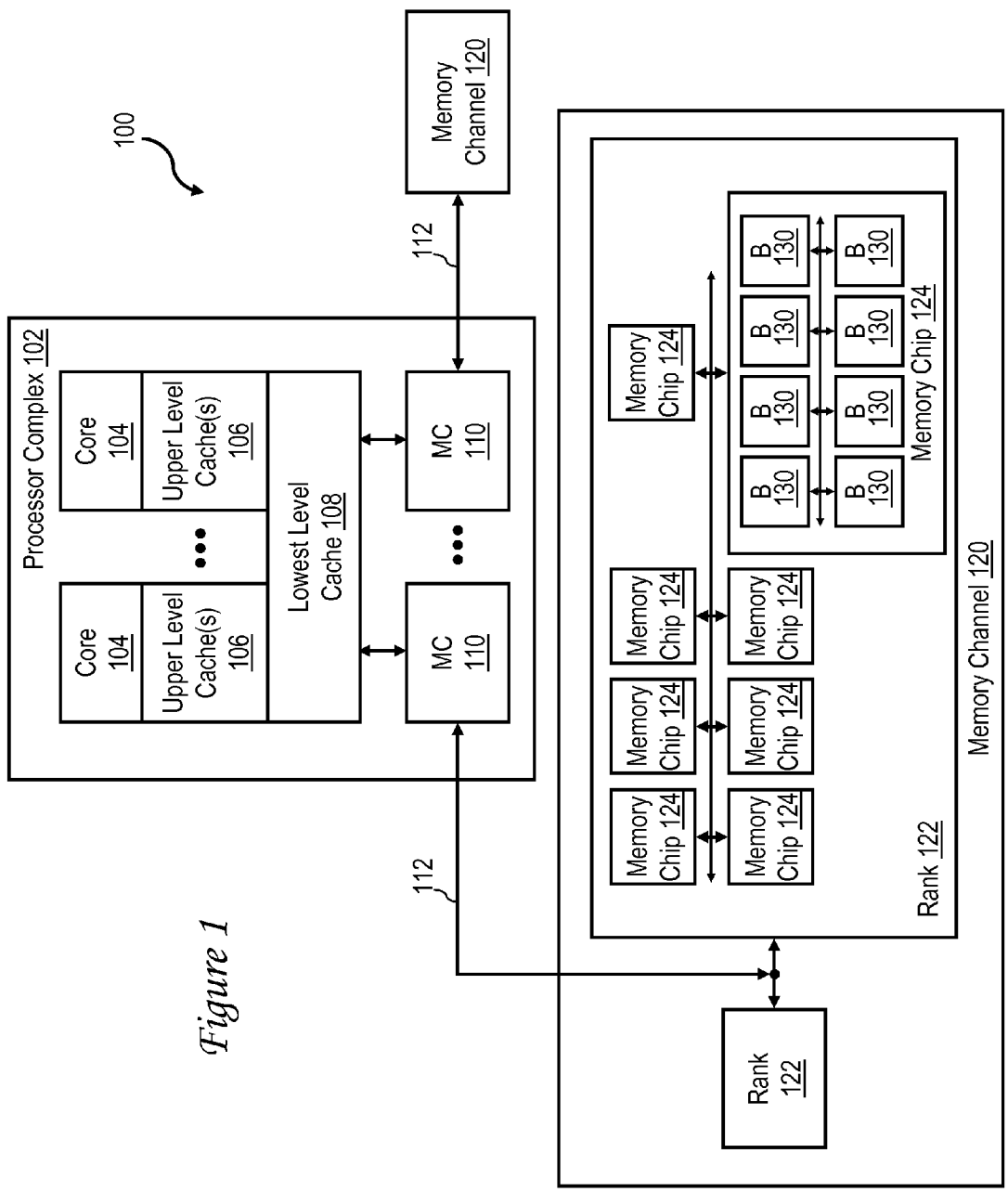
FIG. 1 is high level block diagram of a data processing system in accordance with one embodiment.

With reference now to FIG. 1, there is illustrated a high level block diagram of an exemplary data processing system 100 according to one embodiment. Data processing system 100 includes one or more (and in some embodiments, a multiplicity of) processor complexes 102, which may be implemented, for example, as a chip multiprocessor (CMP) or a multi-chip module (MCM). Processor complex 102 includes at least one processor core 104, which includes logic for processing data under the direction of instructions. In at least some embodiments, each processor core 104 is capable of simultaneously executing multiple independent hardware threads of execution.

Each processor core 104 is supported by a cache hierarchy including one or more upper level caches 106 and a lowest level cache 108. As will be appreciated by those skilled in the art, the cache hierarchy provides processor cores 104 with low latency access to instructions and data retrieved from system memory. While it is typical for at least the highest level cache (i.e., that with the lowest access latency) to be on-chip with the associated core 104, the lower levels of cache memory (including lowest level cache 108) may be implemented as on-chip or off-chip, in-line or lookaside cache, which may be fully inclusive, partially inclusive, or non-inclusive of the contents the upper levels of cache. As indicated, the lowest-level cache 108 can be (but is not required to be) shared by multiple processor cores 104, and further can optionally be configured as a victim cache.

Processor complex 102 additionally includes one or more memory controllers (MCs) 110 each controlling read and write access to system (or main) memory, which is the lowest level of storage addressable by the real address space of processor complex(es) 102. In an exemplary embodiment, each memory controller 110 is coupled by a memory bus 112 to at least one respective memory channel 120, each of which includes one or more ranks 122 of system memory. As further shown in FIG. 1, a rank 122 can include multiple memory chips 124, which may in turn each contain multiple banks 130 for storing data.

Although the embodiments disclosed herein are not constrained to a particular memory technology, many commercially available data processing systems employ Dynamic Random Access Memory (DRAM) system memory because of its low cost and high bit density. In one DRAM implementation, each memory channel 120 is connected to one or more Dual Inline Memory Modules (DIMMs), each containing numerous DRAM memory chips. These DRAM memory chips are arranged logically into one or more independent accessible banks, and the banks are partitioned into pages.

While DRAM memory devices typically output only 16-64 bits per request (depending on the DRAM type and burst settings), they internally operate on much larger (e.g., 2 Kbit) pages, which are sometimes referred to as "rows." Each random access causes all bits of a page to be read into an internal buffer, followed by a "column" access to the requested sub-block of data. Since the latency and power overhead of the page access has already been incurred for all sub-blocks in the page, consecutively accessing multiple columns of the page (so-called "page mode" access) decreases both the latency and power of the subsequent consecutive accesses to the page. In fact, with page mode accesses, latency is approximately one-half that of accesses to different, random pages. In addition, active power consumption is reduced through elimination of extra page reads and extra precharge page writebacks (because a DRAM page read is destructive, the data must be restored). However, page mode accesses to DRAM require memory controller 110 to have the ability to group requests with adjacent memory addresses (i.e., requests exhibiting spatial locality).

Figure 2:
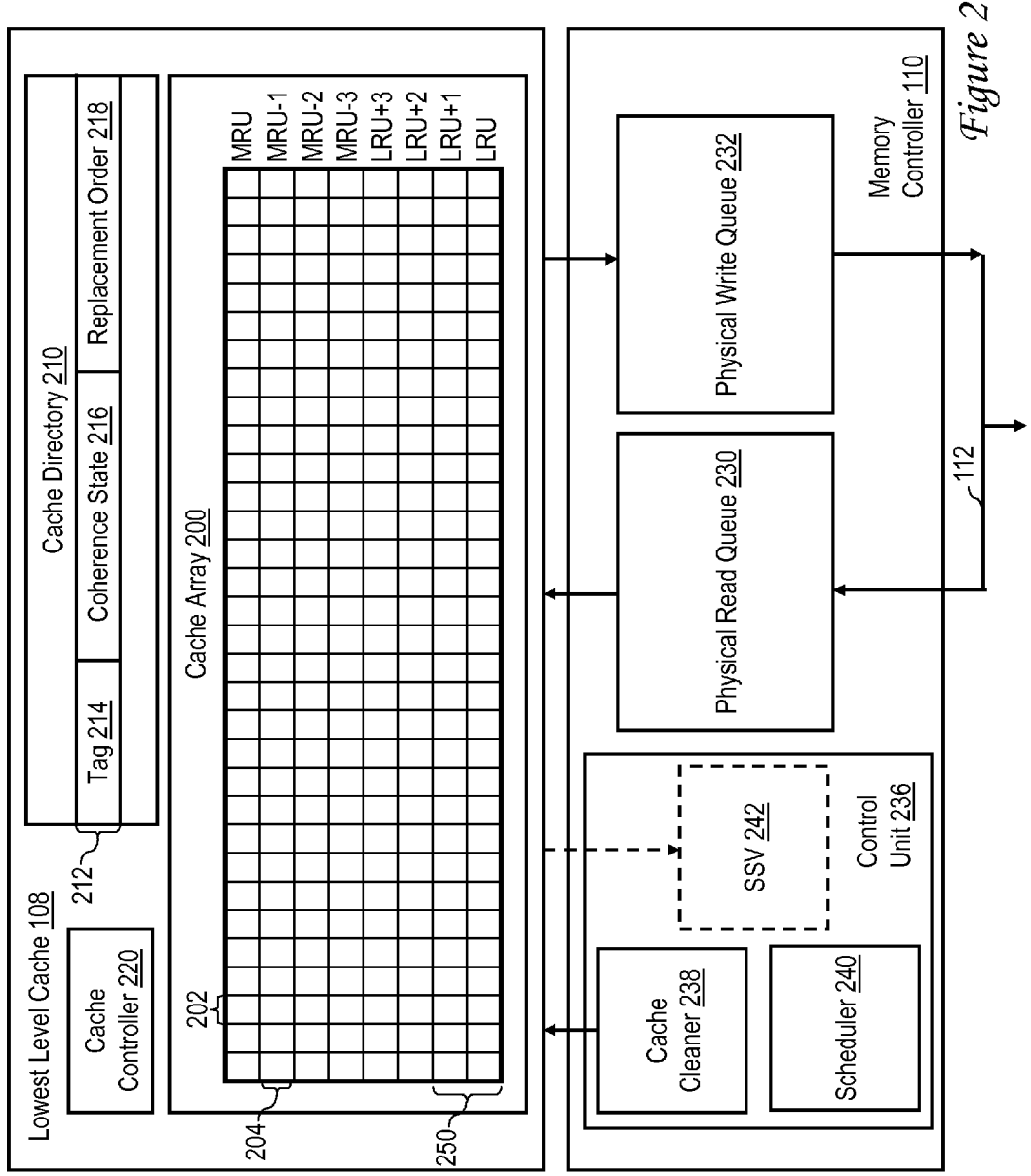
FIG. 2 is a more detailed view of a portion of the memory subsystem of the data processing system of FIG. 1.

Referring now to FIG. 2, there is depicted a more detailed view of lowest level cache 108 and a memory controller 110 in the memory subsystem of data processing system 100 of FIG. 1. As shown, lowest-level cache 108 includes a cache array 200, which in an exemplary embodiment, has a set-associative organization comprising a plurality of sets (also referred to as congruence classes) 202 each including a plurality of ways 204. For example, in one embodiment, cache array 200 may be an 8-way set associative cache having a storage capacity of 16 MB and a cacheline length of 64 bytes.

The contents of cache array 200 are recorded in a cache directory 210. In a typical implementation, cache directory 210 includes a plurality of directory entries 212, each corresponding to a respective cacheline held in cache array 200. In an exemplary embodiment, each directory entry 212 includes a tag field 214 containing the tag portion of the real address of the cacheline held in the corresponding set 202 and way 204 of cache array 200. Directory entry 212 further includes a coherence state field 216 indicating a coherence state of the cacheline in accordance with the implemented coherence protocol. In at least some embodiments, the coherence protocol includes the conventional MOESI coherence states, as well as additional coherence states discussed further below. The conventional MOESI coherence states include:

Modified (M): Identifies the most recent, correct copy of the data, which is inconsistent with the copy in system memory and held exclusively by the cache in the M state.

Owned (O): Identifies the most recent, correct copy of the data, which may be inconsistent with the copy in system memory and may be held in multiple caches. All other processors' caches, if any, that hold the data must hold the data in the Shared state.

Exclusive (E): Identifies the most recent, correct copy of the data, which is consistent with the copy in system memory and held exclusively by the cache in the E state.

Shared (S): Identifies the most recent, correct copy of the data, which is consistent with the copy in system memory and may be held in the caches of other processors in the S or O state.

Invalid (I): Identifies a storage location that does not hold a valid copy of the data.

Because cachelines in the M and O states must be written back to system memory to insure preservation of the most recent, correct copy of the data, cachelines in these states are referred to as "dirty." In contrast, cachelines in the memory-consistent E and S states are referred to as "clean."

Each set 202 also has an associated replacement order field 218 indicating a relative replacement order of the cachelines in that set 202. By convention, the replacement ordering of the ways 204 is identified as Least Recently Used (LRU) for the way 204 holding the next cacheline to be replaced, LRU+1 for the next cacheline to be replaced, and so on until the Most Recently Used (MRU) way 204. In various implementations, replacement order field 218 may implement a true LRU that defines pairwise relative ages for every combination of the ways 204 in a set 202, or alternatively, may implement a tree-based pseudo-LRU.

Access and updates to cache directory 210 and cache array 200 are controlled by logic collectively referred to as cache controller 220. Cache controller 220 participates in the maintenance of memory coherence within data processing system 100 by implementing a portion of the snoop-based or directory-based coherency protocol of data processing system 100 through updates to coherence state fields 216 of directory entries 212. Cache controller 220 also implements a selected replacement policy, which in a preferred embodiment preferentially selects the LRU entry of a full set 202 for replacement in response to a need to load an additional cacheline into that set 202.

Still referring to FIG. 2, memory controller 110 includes a physical read queue 230 that buffers data read from system memory via memory bus 112, a physical write queue 232 that buffers data to be written to system memory via memory bus 112, and a control unit 236 that orchestrates the selection, ordering, and sizes of read and write accesses to system memory. Control unit 236 may be implemented, for example, in any desired combination of hardware, software and/or firmware. In the depicted embodiment, control unit 236 includes multiple subcomponents, including a cache cleaner 238 that actively initiates writebacks of dirty cachelines from lowest level cache 108, a scheduler 240 that prioritizes and orders read and write operations on memory bus 112, and optionally, a set state vector (SSV) 242 indicating the locations of dirty cachelines in lowest level cache 108.

Because queue structures such as physical read queue 230 and physical write queue 232 are costly in terms of power consumption and die area, in commercially practical systems physical read queue 230 and physical write queue 232 have relatively short queue depths, typically not greater than tens of queue entries (e.g., 32 entries). In conventional systems, the short depth of the physical write queue restricts the visibility of the write operations to the memory controller, and consequently, the freedom of the memory controller in scheduling memory accesses to maximize utilization of the memory bus. Control unit 236 accordingly preferably has visibility into at least some of the contents of lowest level cache 108 and utilizes such visibility to coordinate write accesses to system memory with lowest level cache 108. By permitting control unit 236 to have visibility to at least some of the contents of lowest level cache 108, the effective depth of physical write queue 232 can be significantly increased, concomitantly increasing elasticity and visibility for scheduling write operations to memory.

For example, in one embodiment, control unit 236 is provided visibility to the contents of a subset (e.g., 2 or 4) of the ways 204 of lowest level cache 108, which are referred to herein as virtual write queue 250. In a preferred embodiment, the ways 204 to which control unit 236 has visibility are the less recently used ways 204 (e.g., LRU and LRU+1) that are preferred for replacement by the replacement policy of cache controller 220. If two ways 204 of a 16 MB 8-way set associative lowest level cache 108 are employed, virtual write queue 250 would have a capacity of 64K entries.

With this enormous virtual queue capacity, control unit 236 can implement an intelligent writeback policy coordinated between lowest level cache 108 and memory controller 110. The coordinated writeback policy reduces the number of incurred bus turnaround penalties by efficiently grouping multiple write operations into write bursts. Reducing the number of bus turnaround penalties can yield substantial performance benefits, as in a data processing system employing 4 GHz cores 104 and DDR3 DRAM system memory, the write-to-read turnaround time (tWRT) can amount to 66 processor cycles.

The coordinated writeback policy also increases page mode write opportunities. Visibility to a broad region of the LRU space enables cache cleaner 238 to harvest additional writes to be executed in DRAM page mode at higher performance and lower power. In addition, the vast increase in the depth of the virtual write queue 250 as compared to the merely physical write queue of conventional systems enables significantly greater leveling of memory traffic bursts.

Conventional caches implement a forced writeback policy in which the cache initiates a memory write only when a dirty cache line is forced to be removed from the cache, for example, by the coherency protocol or in response to a cacheline fill forcing the replacement of an LRU cacheline. There are two problems with this forced writeback policy. First, writes are generally sent to the memory controller at the time of cacheline fills, meaning that idle cycles on the memory bus cannot be utilized for write operations. Second, the forced writebacks do not necessarily correlate with efficiently accessible locations in memory. However, the coordinated writeback policy employed by control unit 236 selects cachelines to be written back from lowest level cache 108 with full knowledge of the specific cachelines that would be best to writeback for scheduling purposes. Thus, cache cleaner 238 directs lowest level cache 108 to transfer cachelines to memory controller 110 that map to specific memory addresses.

In some embodiments, control unit 236 obtains visibility into lowest level cache 108 by directly accessing cache directory 210. However, cache directory structures are often optimized for efficient CPU-side interaction. Consequently, direct accesses to cache directory 210 by control unit 236 can interfere with directory lookups by cache controller 220, consume additional power, and introduce undesirable delay into the coordinated writeback policy. In at least some embodiments, control unit 236 accordingly implements a Set State Vector (SSV) 242 that provide a local summary of the dirty cachelines residing in the portion of cache array 200 allocated as virtual write queue 250, thus decoupling control unit 236 from cache directory 210 of lowest level cache 108.

Figure 3:
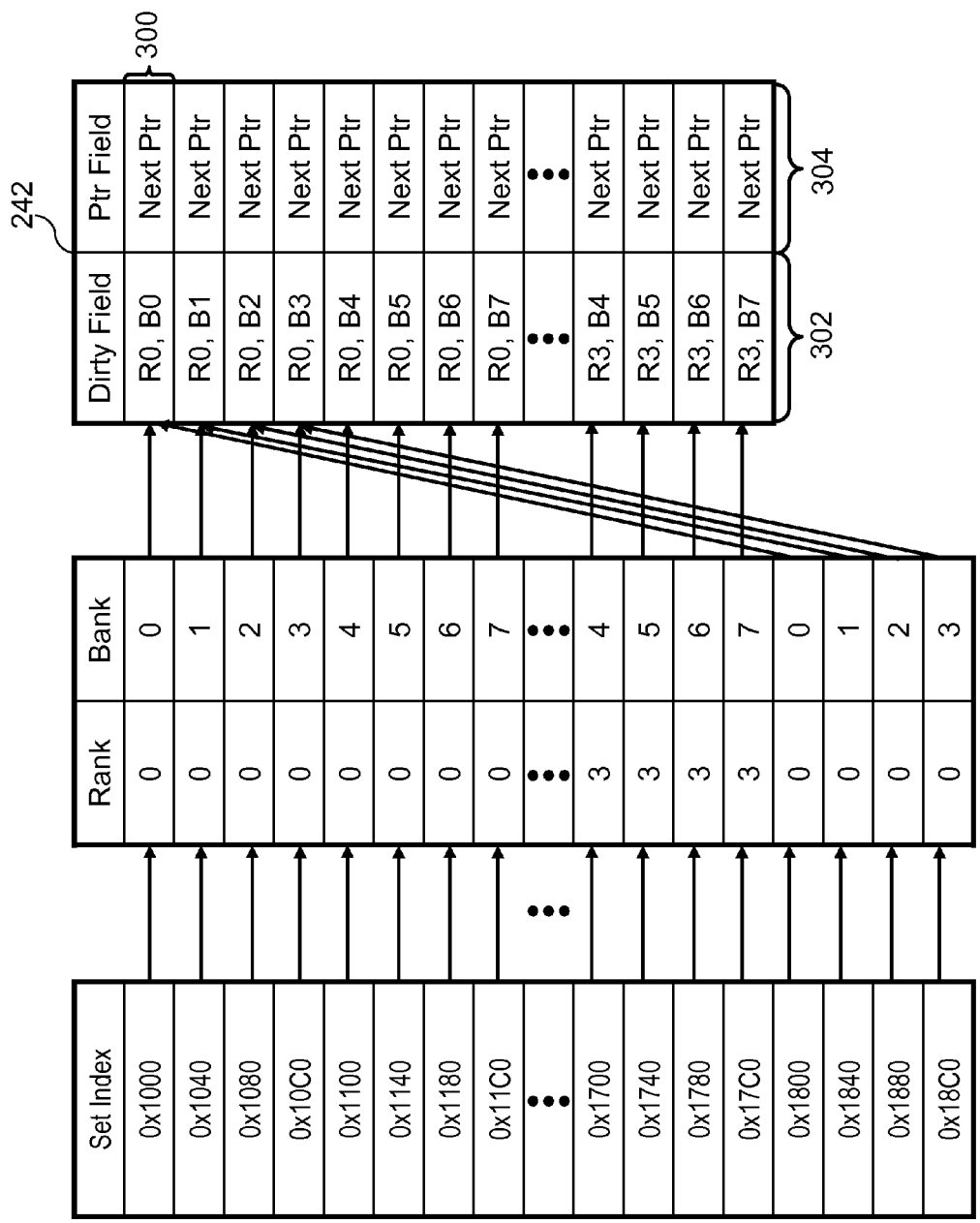
FIG. 3 depicts one exemplary mapping of cache sets in the lowest level cache to entries in the Set State Vector (SSV) maintained by a system memory controller in one embodiment.

With reference now to FIG. 3, there is illustrated an exemplary mapping of cache sets 202 in lowest level cache 108 to entries in SSV 242. In an exemplary embodiment, SSV 242, which may advantageously be stored in a dense Static Random Access Memory (SRAM), includes a plurality of entries 300 each indicating the dirty (i.e., modified with respect to the corresponding contents of system memory) or clean (i.e., unmodified with respect to the corresponding contents of system memory) state of ways 204 within virtual write queue 250. For efficiency, a single entry 300 of SSV 242 preferably contains information regarding multiple sets 202.

In the illustrated embodiment, each entry 300 of SSV 242 includes a dirty field 302 and a pointer field 304. Dirty field 302 can advantageously be implemented as a multiple bit vector in which each bit indicates whether a particular one of the multiple sets 202 of lowest level cache 108 associated with that SSV entry 300 contains dirty cachelines in the less recently used ways 204 belonging to the virtual write queue 250 (e.g., LRU and LRU+1). In this embodiment, a bit in dirty field 302 is set if the associated set 202 contains dirty data in its less recently used entries (e.g., LRU and LRU+1) 204 and reset otherwise. In alternative embodiments, each dirty field 302 may contain two or more bits for each set 202 to provide a dirty indicator with greater specificity regarding the number of dirty cachelines present in the less recently used ways 204 of the associated set 202.

Control unit 236 sets and resets bits of dirty fields 302 utilizing cache state and replacement order information available as part of the existing cache lookup process. Thus, control unit 236 computes and updates SSV bits as needed in response to cache state and LRU information received from cache controller 220 of lowest level cache 108 indicating installation of a modified cacheline in, update to, or writeback of an existing cacheline in a way 204 belonging to the virtual write queue. Specifically, assuming an 8-way true LRU algorithm implemented with 28 bits for each cache set, an LRU "distance" for a cache access is calculated by adding the 7 direction bits for each way 204 in the target set 202. If the computed distance is greater than the criticality distance (5 in the example with 8 ways 204), the SSV bit corresponding to the set 202 containing the target cacheline is updated by the cache access. Alternatively, if a pseudo-LRU replacement algorithm is implemented, the relative replacement order of a target cacheline can be estimated by counting the number of pointers towards each way. While some additional power is dissipated in accessing SSV 242, the compact size of SSV 242 relative to cache directory 210 means that the additional power consumption is not significant.

In a preferred embodiment, adjacent sets 202 in lowest level cache 108 do not necessarily map to adjacent entries in SSV 242. Instead, the mapping of real addresses onto the physical system memory channel/rank/bank resources is employed. For example, FIG. 3 illustrates an exemplary closed-page mapping for a memory channel 120 having four ranks 122 numbered 0 through 3, each having eight banks 130 numbered 0 through 7. In this example, every $32^{nd}$ cacheline maps to the same entry 300 of SSV 242. To accomplish this mapping, all bits that feed the memory channel/rank/bank mapping function of memory controller 110 are preferably contained within the set index of the real memory address utilized to select a set 202 of lowest level cache 108 for access. This constraint advantageously enables not only the SSV mapping function, but also page mode harvesting without producing any significant negative effects. By tailoring the organization of SSV 242 in this manner, each entry 300 of SSV 242 represents a particular memory channel/rank/bank (e.g., R0, B0 for Rank 0, Bank 0 of the associated memory channel 120) configured in data processing system 100, and each access to SSV 242 returns a bit vector (e.g., 64 bits) representing page mode accesses that can be made to the associated DRAM resource (i.e., memory channel/rank/bank).

In the depicted embodiment, scheduler 240 maintains a working pointer for each of these configured regions. As scheduler 240 receives writeback requests, scheduler 240 uses the associated working pointer to read the entry 300 of SSV 242 having a matching Next Ptr in its pointer field 304. From this matching entry 300, scheduler 240 selects a specific set 202 for which a writeback request will be generated and sent to cache controller 220 to initiate coordinated writeback of the cacheline held in the specific set 202.

Figure 4:
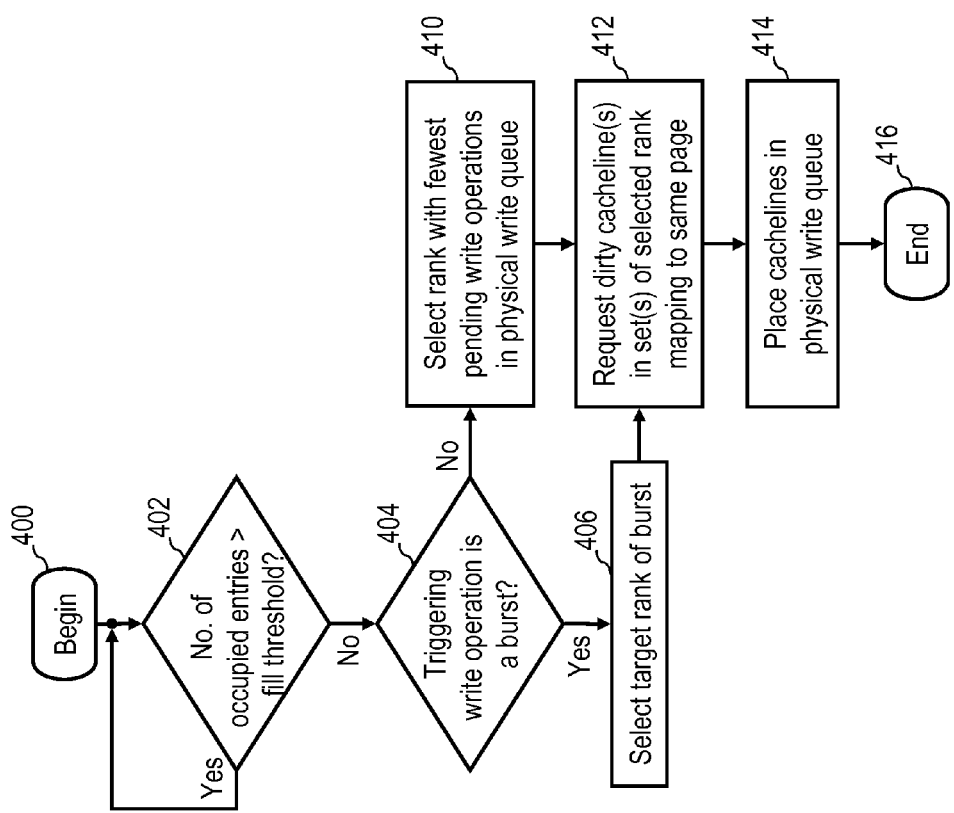
FIG. 4 is a high level logical flowchart of an exemplary method by which a memory controller opportunistically fills its physical write queue in accordance with one embodiment.

Referring now to FIG. 4, there is depicted a high level logical flowchart of an exemplary method by which memory controller 110 opportunistically fills physical write queue 232 in accordance with one embodiment. As with the other logical flowcharts presented herein, the ordering of steps is logical rather than strictly chronological, and in some cases some of the illustrated steps can be performed in parallel or in a different order than that shown.

The process begins at block 400 with physical write queue 232 filled to some level with a mix of write operations to various system memory resources (i.e., ranks and banks) Next, at block 402 cache cleaner 238 determines whether or not the number of occupied entries within physical write queue 232 is greater than a predetermined fill threshold chosen to keep physical write queue 232 somewhat full, while retaining some capacity to receive coordinated cache writebacks. As will be appreciated, the coordinated cache writebacks can vary in length, depending on the number of eligible lines found in the same memory page. Accordingly, it is desirable if physical write queue 232 maintains sufficient available capacity to absorb these variable length operations.

If cache cleaner 238 determines at block 402 that the number of occupied entries within physical write queue 232 is greater than the fill threshold, the process iterates at block 402. During the period in which the process of FIG. 4 iterates at block 402, scheduler 240 executes write operations based on the conditions of the system memory devices, read queue operations, and the current write priority, which is determined dynamically depending on the fullness of the virtual write queue, as discussed further below with reference to FIG. 5. As scheduler 240 executes write operations to system memory from physical write queue 232, occupancy of physical write queue decreases to the point that the number of occupied entries is less than or equal to the fill threshold. In response to this condition, the process proceeds from block 402 to block 404 and following blocks, which depict cache cleaner 238 refilling physical write queue 232 to at least the fill threshold.

Block 404 illustrates cache cleaner 238 determining whether or not the write operation that triggered the occupancy of physical write queue 232 to drop to the fill threshold is a write burst operation. If so, cache cleaner 238 selects the target rank of the write burst operation as the target of a cache cleaning request to cache controller 220, as shown at block 406. If, however, cache cleaner 238 determines at block 404 that the write operation that caused the occupancy of physical write queue 232 to drop below the fill threshold is not a write burst operation, cache cleaner 238 works to rebalance physical write queue 232 by selecting the rank with the fewest write operations pending in physical write queue 232 as the target rank of the cache cleaning request to cache controller 220 (block 410). By so doing, cache cleaner 238 maintains an even mix of operations to various system memory resources and enables opportunistic write execution in that a write operation is always available to any system memory resource that becomes idle.

Following either block 406 or block 410, the process proceeds to block 412. Block 412 illustrates cache cleaner 238 sending to cache controller 220 a cache cleaning request for a dirty cacheline in virtual write queue 250 that resides in a set 202 mapping to the selected rank of system memory. In some embodiments, cache controller 220 interprets the cache cleaning request as a request for a single dirty cacheline. In other alternative embodiments, cache controller 220 interprets the cache cleaning request as a request for multiple (e.g., four) cachelines within the same system memory page.

In response to the cache cleaning request, cache controller 220 accesses the requested set(s) and returns copies of the dirty cacheline(s) to physical write queue 232, while retaining its copy of the now cleaned cachelines in cache array 200. As shown at block 414 of FIG. 4, in response to receipt of the dirty cachelines from lowest level cache 108, memory controller 110 places the dirty cachelines in unoccupied entries of physical write queue 232. Thereafter, the process depicted in FIG. 4 terminates at block 416.

As will be appreciated, because dirty cachelines are speculatively written back to system memory, there is some chance that extra memory write traffic is introduced. Specifically, if a store occurs to a cacheline after it is cleaned, the cleaning operation is wasted. To reduce such additional write traffic, cache controller 220 preferably updates the coherence state field 216 of each cleaned cacheline to identify the cacheline as having been cleaned. In one preferred embodiment, the coherence protocol implemented by lowest level cache 108 includes new coherence states in addition to the conventional MOESI coherence states to identify cachelines that were once dirty but are now clean and to identify a previously cleaned cachelines that have again been modified and are not again eligible for cleaning By including these additional coherency states, modified cleaned cachelines can be distinguished from dirty cachelines and excluded by cache controller 220 from the scope of subsequent cache cleaning requests.

A complete extension to the conventional MOESI protocol would require "cleaned" versions of all four valid states (i.e., Mc, Oc, Ec and Sc, where the suffix "c" indicates cleaned). Such a solution would present additional overhead in that the total number of coherence states in the coherence protocol would reach nine. Because conventional MOESI systems require a minimum of three state bits of encoding, three unused state encodings remain available. Consequently, the overhead of adding a fourth coherence state bit can be avoided by excluding the Shared Cleaned state, thus maintaining the same state overhead as the conventional MOESI protocol.

An exemplary implementation of such a coherence protocol is summarized in the state transition table given in Table I. Table I identifies two cases of potential transitions into the Shared Cleaned (Sc) state, namely, the transition of Owned (O) cacheline to Shared Cleaned (Sc) upon cleaning and the transition of an Exclusive Cleaned (Ec) cacheline to Shared Cleaned (Sc) upon a read snoop. However, empirical analysis reveals no performance degradation due to the omission of the Shared Cleaned state.

TABLE I

| Initial State | Event | Next State | Comment |
|---|---|---|---|
| M | Eviction | I | Forced Writeback |
| M | Clean | Ec | Scheduled Writeback |
| M | Snooped Read | O | |
| O | Store | M | Invalidate broadcast |
| O | Eviction | I | |
| O | Clean | S | State transition disallowed if Sc omitted, but permitted if Sc state implemented |
| E | Store | M | |
| E | Eviction | I | |
| E | Shared Read | S | |
| S | Store | M or Mc | Mc if Oc state present in system; M otherwise |
| S | Eviction | I | |
| I | Store | M | |
| I | Read Memory | E | |

TABLE I-continued

| Initial State | Event | Next State | Comment |
|---|---|---|---|
| I | Read Cache | S | |
| Mc | Eviction | I | |
| Mc | Snooped Read | Oc | |
| Oc | Store | Mc | |
| Oc | Snooped Read | Oc | |
| Oc | Eviction | I | |
| Ec | Store | Mc | |
| Ec | Snooped Read | S | Loss of cleaned information, unless Sc implemented |

To promote high utilization of memory bus 112, scheduler 240 preferably dynamically adjusts the relative priority of read and write operations on memory bus 112, responding to the current workload's overall read-to-write ratio while still handling bursts of operations. In general, scheduler 240 preferentially schedules read operations over write operations, as write operations only indirectly slow execution of the workload of data processing system 100 when all queuing of operations is consumed. However, given the finite queuing of physical systems, write operations must at some point be granted priority over read operations. In contrast to conventional systems, which can only prioritize based upon operations present in physical read and write queues, scheduler 240 adjusts prioritization of read operations and write operations based at least in part upon the contents of virtual write queue 250.

Figure 5:
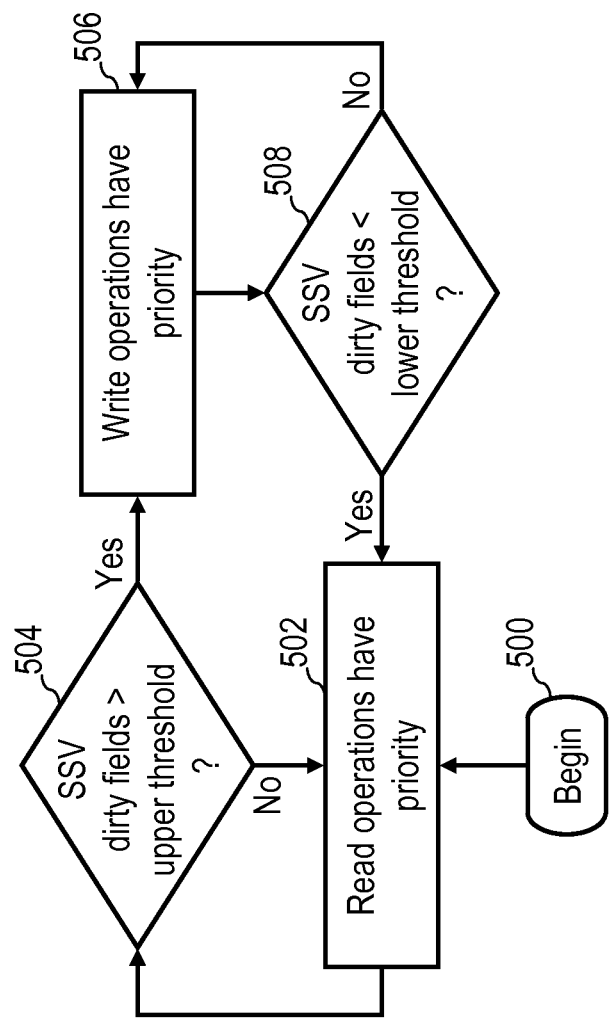
FIG. 5 is a high level logical flowchart of an exemplary methodology by which a memory controller prioritizes read and write operations on the memory bus in accordance with one embodiment.

One exemplary prioritization methodology that may be implemented by scheduler 240 is depicted in FIG. 5. The exemplary prioritization methodology begins at block 500 and then proceeds to block 502, which depicts scheduler 240, by default, assigning higher priority on memory bus 112 to read operations. With this default priority, scheduler 240 will not schedule any write operations from physical write queue 232 to system memory on memory bus 112 as long as there is any outstanding read request that has not been satisfied.

While giving read operations priority, scheduler 240 determines at block 504 whether or not the number of dirty cachelines in virtual write queue 250 exceeds an upper threshold, for example, one half of the cachelines in virtual write queue 250. In embodiments in which control unit implements SSV 242, the determination depicted at block 504 is preferably made by simply comparing the number of dirty cachelines indicated by SSV 242 to the upper threshold. In response to a negative determination at block 504, scheduler 240 maintains the default priority for read operations, as represented by the process returning from block 504 to block 502. If, on the other hand, scheduler 240 determines at block 504 that the number of dirty cachelines in virtual write queue 250 exceeds the upper threshold, scheduler 240 temporarily assigns a higher priority to write operations, as indicated by the process proceeding from block 504 to block 506.

While write operations are given priority, scheduler 240 determines at block 508 whether or not the number of dirty cachelines in virtual write queue 250 is less than a lower threshold (e.g., one or more write burst lengths less than the upper threshold). In embodiments in which control unit implements SSV 242, the determination depicted at block 508 is again preferably made by simply comparing the number of dirty cachelines indicated by SSV 242 to the lower threshold. In response to a negative determination at block 508, scheduler 240 maintains a higher priority for write operations, as represented by the process returning from block 508 to block 506. If, on the other hand, scheduler 240 determines at block 508 that the number of dirty cachelines in virtual write queue 250 is less than the lower threshold, scheduler 240 resumes the default higher priority for read operations, as indicated by the process returning from block 508 to block 502, which has been described.

It should be appreciated that the prioritization methodology illustrated in FIG. 5 is merely exemplary of the myriad of possible prioritization schemes. In alternative embodiments, more complex dynamic priority mechanisms can be employed, including ones that employ a larger dynamic range of virtual write queue 250 or that implement finer control of the number of idle cycles on memory bus 112 prior to granting write operations priority.

As previously described, a significant barrier to efficient utilization of a memory bus 112 is the bus turnaround penalty between write and read operations (tWRT). In addition, alternating between different ranks on the same memory bus 112 can introduce wasted bus cycles. Further, to achieve good efficiency when using DRAM system memory, adjacent operations to different pages of the same DRAM bank should be avoided. These factors motivate implementation of a scheduler 240 that schedules long bursts of read operations or write operations to ranks, while avoiding bank conflicts. Scheduler 240 achieves scheduling of lengthy write bursts by leveraging its visibility into virtual write queue 150 to maintain an optimized mix of write operations in physical write queue 232.

Figure 6:
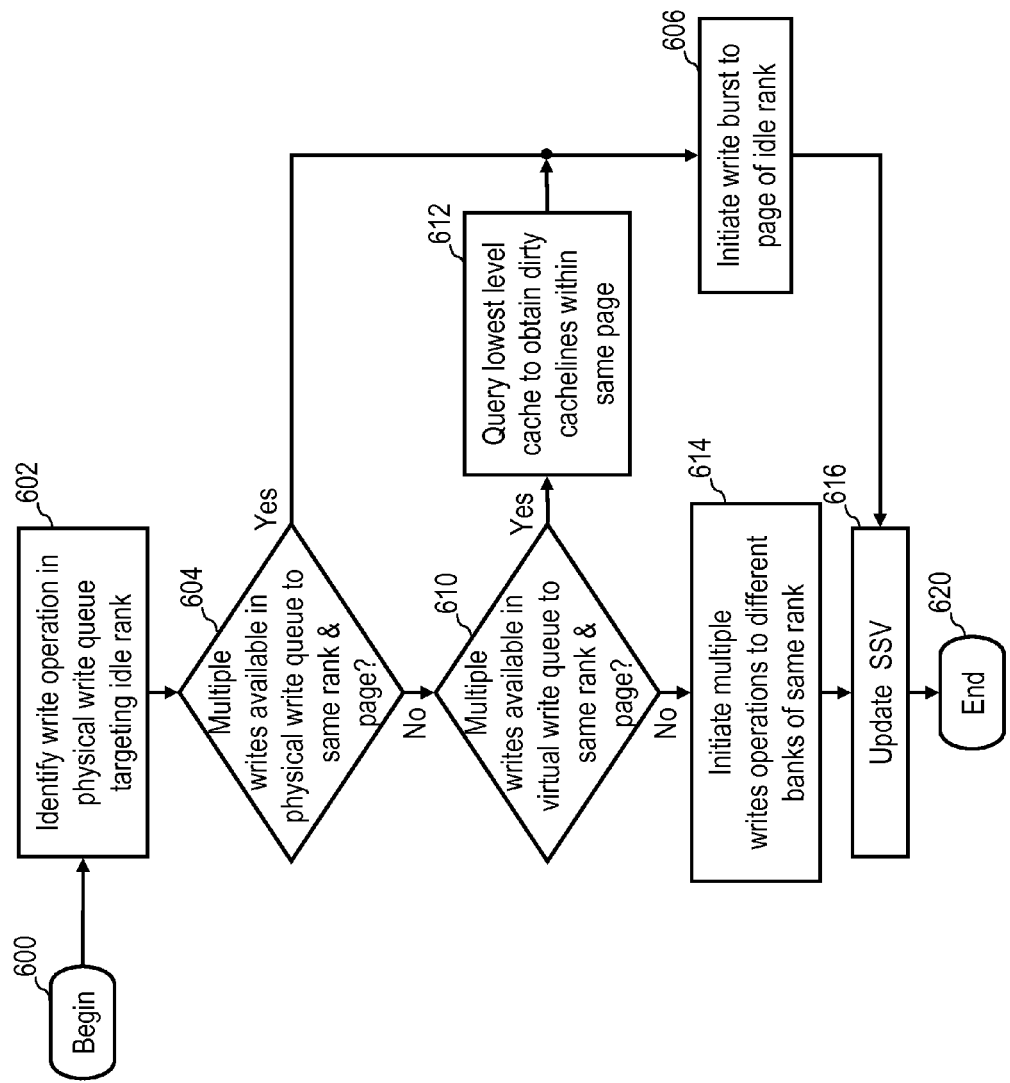
FIG. 6 is a high level logical flowchart of an exemplary process by which a memory controller schedules write operations to system memory via a memory bus in accordance with one embodiment.

Referring now to FIG. 6, there is depicted a high level logical flowchart of an exemplary process by which scheduler 240 issues write operations to system memory via memory bus 112 in accordance with one embodiment. The process of FIG. 6 assumes that scheduler 240 has first granted priority to write operations, for example, in accordance with the process illustrated in FIG. 5.

The process of FIG. 6 begins at block 600 and then proceeds to block 602, which depicts scheduler 240 identifying a write operation in physical write queue 232 that targets a temporarily idle rank 122 of system memory. As discussed above with reference to FIG. 4, cache cleaner 238 attempts to maintain in physical write queue 232 several write operations to each rank 122 that can be opportunistically executed without idle cycles. In at least some embodiments, scheduler 240 can select the write operation based upon one or more factors, such as which rank has the most queued write operations, which rank was written least recently, etc.

In the depicted process scheduler 240 further determines at block 604 whether or not multiple write operations targeting the same page in the targeted rank are currently queued in physical write queue 232. If not, the process passes to block 610, which is described below. If, however, scheduler 240 determines at block 604 that multiple write operations targeting the same page in the targeted rank are presented queued in physical write queue 232, the process proceeds to block 606, which illustrates scheduler 240 initiating a single write burst operation on memory bus 112 targeting the common page of the idle rank 122 of system memory in order to update system memory with the dirty data of the multiple write operations. Thereafter, the process proceeds to block 616, which is described below.

Returning to block 604, if physical write queue 232 does not presently buffer multiple write operations to the same page of the target rank 122, scheduler 240 determines at block 610 whether or not the virtual write queue 250 contains multiple dirty cachelines mapping to the same page of the target rank as the write operation buffered in physical write queue 232. If not, the process passes to block 614, which is described below. If, on the other hand, scheduler 240 makes an affirmative determination at block 610, scheduler 240 queries lowest level cache 108 to obtain from virtual write queue 250 multiple dirty cache lines within the same memory page of the target rank 122 (block 612). In addition, scheduler 240 initiates a write burst to the common page of the target rank 122 of system memory, preferably prior to receiving the dirty cacheline data from lowest level cache 108 (block 606). Thereafter, the process proceeds to block 616, which is described below.

If scheduler 240 determines at block 610 that it is not possible to provide a burst of write operations targeting the same rank 122 and page, scheduler 240 initiates multiple write operations to different banks of the target rank 122, as shown at block 614. Following either block 614 or block 606, scheduler 240 updates the appropriate dirty fields 242 of SSV 242 to indicate which cachelines in virtual write queue 250 have been cleaned. Thereafter, the process terminates at block 620.

Figure 7:
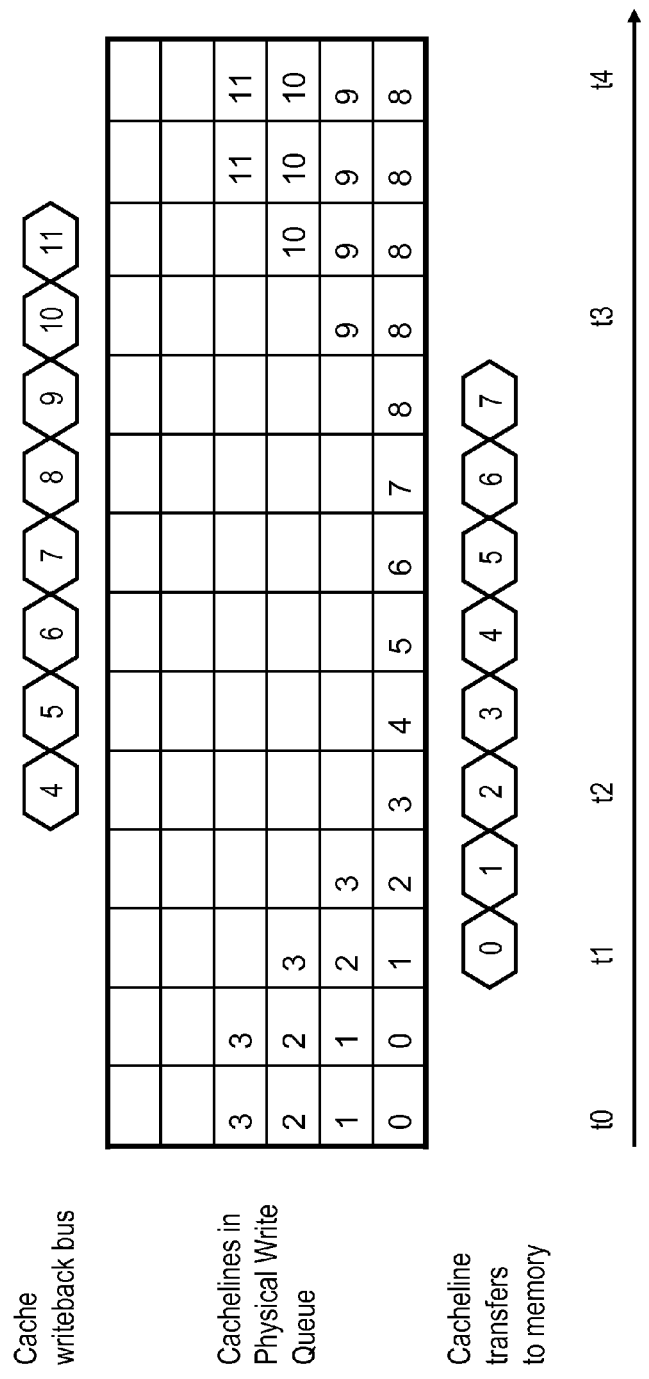
FIG. 7 is a timing diagram illustrating the timing of the placement of cachelines into the physical write queue of a memory controller by the lowest level cache and the timing of transferring those cachelines from the physical write queue to system memory.

With reference now to FIG. 7, there is illustrated an exemplary timing diagram of the process shown in FIG. 6. In this example, at time t0 physical write queue 232 initially contains four cachelines (cachelines 0 to 3 in the first column) that map to the same target rank 122 of system memory. At t0, scheduler 240 initiates a write burst operation to write eight cachelines to the target rank 122. Because only four cachelines of data are available in physical write queue 232 at t0, the remaining four cachelines of the write burst operation must be transferred from lowest level cache 108 to physical write queue 232. Consequently, scheduler 240 transmits a request at time t1 to cache controller 220 coincident with the initiation of the write burst operation to system memory.

To maintain back-to-back transfers on memory bus 112, cache controller 220 must be able to provide a dirty cacheline of data to physical write queue 232 within the delay of the transfer of data from physical write queue 232 to system memory. In the example of FIG. 7, the first cacheline of dirty data, cacheline 4, arrives at physical write queue 232 at time t2. At this point, physical write queue 232 has been depleted of cachelines 0-3, and the dirty cacheline data is streamed to the target rank 122 of system memory from lowest level cache 108. As the eight-line write burst operation completes at time t3, the remaining dirty cachelines from lowest level cache 108 transfer are used to refill physical write queue 232. At time t4, physical write queue 232 is once again full and ready to execute another write burst operation.

As has been described, memory scheduling efficiency is heavily influenced by the interleaving of read and write operations on a memory bus because of the timing gaps required between read and write operations in a continuous memory access sequence. Using the coordinated writeback techniques disclosed herein, the number of consecutive read/write operations the memory controller issues before switching the operation type on the memory bus can be significantly increased, concomitantly increasing memory bus utilization. For example, if scheduler 240 can manage 32 reads/writes per scheduling block, bus utilization can exceed 90%.

The disclosed coordinated writeback techniques disclosed herein also expose heretofore unavailable opportunities for page mode write operations. In conventional systems, write operations are generated as older cache lines are evicted to make room for newly allocated lines. As such, spatial locality at eviction time can be obscured through variation in set usage between allocation and eviction. For practical sizes of write queues, such as 32 entries, there is essentially no opportunity for page mode write operations. However, by giving a memory controller visibility into the spatial locality in the virtual write queue, significant page mode write opportunities are available.

While one or more preferred embodiments have been shown and described, it will be understood by those skilled in the art that various changes in form and detail may be made therein without departing from the spirit and scope of the appended claims. For example, although certain aspects have been described with respect to a software and/or firmware that directs particular functions herein disclosed, it should be understood that such functions can alternative be implemented by a program product including a computer-readable storage medium storing program code that can be processed by a data processing system.

As one example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core, a multi-level cache memory hierarchy including a lowest level cache, a memory controller, and a system memory, wherein the lowest level cache includes a cache controller that controls read and write access to a cache array of the lowest level cache and updates a cache directory of the lowest level cache to maintain coherence, wherein the lowest level cache includes a virtual write queue into which the memory controller has visibility, and wherein the virtual write queue is formed of only a subset of a cache array of the lowest level cache, said method comprising:

the memory controller controlling read and write access to the system memory, wherein the system memory forms a lowest level of storage addressable by a real address space of the processor core, wherein the memory controller includes a physical write queue from which the memory controller write data received from the lowest level cache to the system memory, and wherein the controlling includes:

the memory controller determining addresses of data present in the physical write queue of the memory controller;

in response to the determining, the memory controller initiating cleaning accesses to the lowest level cache to place into the physical write queue copies of selected cachelines of data from the virtual write queue having spatial locality with the data present in the physical write queue without removing the selected cachelines from the lowest level cache; and in response to receipt of the copies of the selected cachelines of data, the memory controller placing the copies of the selected cachelines of data in the physical write queue and thereafter writing at least some of the copies of the selected cachelines and the data present in the physical write queue to the system memory in a write burst operation.

2. The method of claim 1, and further comprising:
the lowest level cache, prior to the cleaning accesses, holding the selected cache lines in at least one dirty coherence state; and
the lowest level cache, following the cleaning accesses by the memory controller, retaining the selected cachelines in a clean coherence state.

3. The method of claim 2, wherein:
the clean coherence state is a first clean coherence state;
the lowest level cache implements the first clean coherence state and a second clean coherence state; and
the first clean coherence state identifies only those cachelines in the lowest level cache that have been cleaned by the memory controller.

4. The method of claim 1, wherein:
the lowest level cache includes a plurality of ways;
the virtual write queue includes only a subset of the plurality of ways that are less recently used; and
the method further comprises the memory controller restricting its cleaning accesses to the virtual write queue.

5. The method of claim 1, and further comprising:
the memory controller initiating the cleaning accesses to the virtual write queue in response to a number of occupied entries in the physical write queue being less than a fill threshold.

6. The method of claim 1, and further comprising:
the memory controller initiating a cleaning access to a selected cacheline in the virtual write queue in response to the write burst operation, wherein the cleaning access to the virtual write queue by the memory controller requests a copy of a dirty cacheline having spatial locality to another of the plurality of cachelines of data written to system memory by the write burst operation.

7. The method of claim 1, wherein:
the system memory is organized in banks and ranks, with each rank including multiple banks; and
the method further includes the memory controller maintaining a state data structure having a plurality of entries indicating locations of dirty cache lines in the lowest level cache, wherein each entry in the state data structure contains information for physical memory addresses mapping to a respective combination of rank and bank.

8. The method of claim 1, wherein:
the data processing system further includes a memory bus that couples the memory controller to the system memory;
the method further includes:
the memory controller buffering in a physical read queue in the memory controller data read from the system memory via the memory bus; and
the memory controller granting priority to write operations over read operations on the memory bus based upon a number of dirty cachelines in the lowest level cache memory.

9. The method of claim 8, wherein:
the lowest level cache includes a first subset of cache lines allocated as the virtual write queue accessible to the memory controller and a second subset of cache lines; and
the method further includes the memory controller granting priority to write operations over read operations on the memory bus based upon a number of dirty cachelines within the virtual write queue but not based upon a number of dirty cachelines within the second subset.

10. The method of claim 9, wherein:
the lowest level cache is a set-associative cache including a plurality of ways; and
the first subset comprises a subset of the plurality of ways that are less recently used.

11. The method of claim 6, wherein the memory controller initiating the cleaning access includes the memory controller, in response to the write burst operation, beginning to perform a write burst while at least one of multiple dirty cachelines included in the write burst resides in the lowest level cache but not in the physical write queue of the memory controller.

* * * * *